(12) United States Patent
Schröder et al.

(10) Patent No.: US 12,489,120 B2
(45) Date of Patent: Dec. 2, 2025

(54) REDOX FLOW BATTERY (71) Applicant: ELECTROCHEM, S.L., Barcelona (ES)

(72) Inventors: Philipp Schröder, Innsbruck (AT); Dagmar Obendorf, Innsbruck (AT); Günther Bonn, Innsbruck (AT); Noemi Aguiló-Aguayo, Innsbruck (AT); Dorian Rhomberg, Innsbruck (AT); Thomas Drozdzik, Innsbruck (AT); Thomas Bechtold, Innsbruck (AT)

(73) Assignee: ELECTROCHEM, S.L., Barcelona (ES)

( * ) Notice: Subject to any disclaimer, the term of this patent is extended or adjusted under 35 U.S.C. 154(b) by 1000 days.

(21) Appl. No.: 17/909,962

(22) PCT Filed: Apr. 16, 2020

(86) PCT No.: PCT/EP2020/060680
§ 371 (c)(1),
(2) Date: Oct. 16, 2022

(87) PCT Pub. No.: WO2020/212473
PCT Pub. Date: Oct. 22, 2020

(65) Prior Publication Data
US 2023/0361317 A1 Nov. 9, 2023

(30) Foreign Application Priority Data
Apr. 16, 2019 (EP) .................................... 19169602

(51) Int. Cl.
H01M 4/90 (2006.01)
H01M 8/18 (2006.01)

(52) U.S. Cl.
CPC ......... *H01M 4/9008* (2013.01); *H01M 8/188* (2013.01); *H01M 2300/0014* (2013.01)

(58) Field of Classification Search
CPC ........................... H01M 8/188; H01M 4/9008
See application file for complete search history.

(56) References Cited

U.S. PATENT DOCUMENTS

2014/0030572 A1\* 1/2014 Esswein ............ H01M 10/4242
429/105
2015/0048777 A1\* 2/2015 Goldstein ............. H02J 7/0042
429/70
(Continued)

FOREIGN PATENT DOCUMENTS

EP 2846389 A1 3/2015
EP 3291361 A1 \* 3/2018 ............ H01M 12/06
WO 2008/009993 A2 1/2008

OTHER PUBLICATIONS

Bermudes et. al. "Effect of pH on the Stability of the Chelates FeEDDHA, FeEDDHMA and their Isomers" Agrochimica, vol. XLVI—N. 5 , p. 202, 2002 (Year: 2002).\*
(Continued)

Primary Examiner — Alexander Usyatinsky
(74) Attorney, Agent, or Firm — Workman Nydegger

(57) ABSTRACT

A redox flow battery, comprising a first electrolyte storage (1), a second electrolyte storage (2), an electrochemical cell connected to said first and second electrolyte storages (1, 2), wherein said electrochemical cell comprises a first half-cell and a second half-cell, wherein said first half-cell comprises a cathode (7), wherein said second half-cell comprises an anode (8), wherein said first and second half-cells are separated from each other by an ion exchange membrane
(Continued)

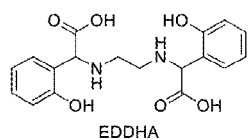

EDDHA

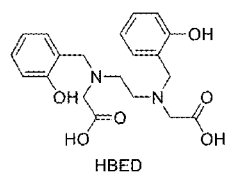

HBED

EDDSA

EDDCA (9), wherein said first electrolyte storage comprises an aqueous solution comprising an iron complex of a compound of formula I

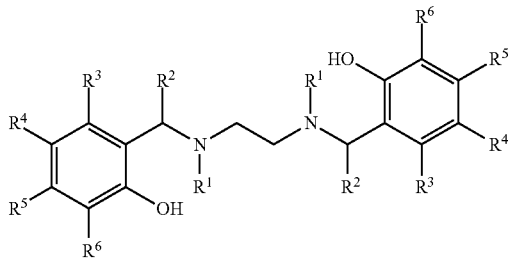

(I)

and stereoisomers of compound of formula I.

10 Claims, 6 Drawing Sheets

(56) References Cited

U.S. PATENT DOCUMENTS

2015/0214565 A1 7/2015 Deguchi et al.
2018/0069283 A1* 3/2018 Lamaka ............... H01M 12/06
2019/0363387 A1* 11/2019 Selverston ............ H01M 8/08

OTHER PUBLICATIONS

The decision of EPO to grant a Patent for Application EP 20718672 (Year: 2023).*
Gong et al., All-Soluble All-Iron Aqueous Redox-Flow Battery, ACS Energy Letters, vol. 1. No. 1. May 3, 2016 (May 3, 2016), pp. 89-93, XP055620395.
International Preliminary Report on Patentability received for PCT Patent Application No. PCT/EP2020/060680, mailed on Oct. 28, 2021, 8 pages.
International Search Report and Written Opinion received for PCT Patent Application No. PCT/EP2020/060680, mailed on Jul. 21, 2020, 10 pages.

* cited by examiner

Fig. 1a

EDDHA

HBED

EDDSA

EDDCA

REDOX FLOW BATTERY

The present invention relates to a redox flow battery, comprising a first electrolyte storage, a second electrolyte storage, an electrochemical cell connected to said first and second electrolyte storages, wherein said electrochemical cell comprises a first half-cell and a second half-cell, wherein said first half-cell comprises a cathode, wherein said second half-cell comprises an anode, wherein said first and second half-cells are separated from each other by an ion exchange membrane.

BACKGROUND OF THE INVENTION

The increased use of energy sources which base on renewable systems requires the development of efficient systems for storage of electrical energy and the development of smart grid concepts for delocalised energy storage and delivery.

Redox flow cells or batteries, are among the most promising systems for high capacity storage of electrical energy in stationary devices. Thus redox flow cells are of high relevance for smart grid applications and storage of energy from non-steady energy sources e.g. wind power, solar energy. Compared to other conventional battery concepts e.g. Li-Ion batteries or batteries which base on the deposition of an element, the capacity of a flow cell is determined by the size of the storage vessels, thus rather small cells still can exhibit very high capacities. For flexible high capacity installations for electrical energy storage thus flow cells will be of high interest. For a wider application huge amounts of electrolyte will be required, thus careful consideration of the composition of the electrolyte will be essential.

For large scale applications a number of conditions have to be fulfilled by the redox couples used for the anodic (oxidising) and cathodic (reducing) part of the redox flow cell:

The redox couples used should be able to deliver a high cell voltage, which is the result of the redox potential values of the two individual couples used as filling in the flow cell. The height of the cell potential results from the potential difference between the two redox couples used. Thus the redox couple used in the negative electrolyte (cathode) should be highly negative and the redox potential of the positive electrolyte (anode) should be highly positive to allow a large total potential difference.

The solvent used as electrolyte should be an aqueous system as solvent based systems will cause high costs and ecological risks in case of leakages, flammability and accident release of the cell electrolyte into the environment.

The electrolytes should not operate at highly alkaline or acidic conditions as such electrolytes lead to risks of corrosion and environmental concerns.

Both cell electrolytes should operate at the same pH as continuous neutralisation of any difference in pH value differences between the positive and the negative side will occur.

Electrolytes often contain heavy metal ions, which must be non-toxic. Thus non-toxic complexes are highly interesting as electrolytes.

Permeation of electrolyte components through the separator membrane, which in many cases is an ion-selective membrane should be minimal as transfer of electrolyte between the two separated chambers would lead to serious deterioration of the function. For metal coordination compounds larger sized ligands and ligands exhibiting the same charge as the ion-exchange membrane are preferable.

Electrolytes should permit high current density, low overvoltages and high current efficiency to minimise energy losses during charge/discharge cycles.

High stability of both oxidation states of the redox couples used is required to avoid precipitation or deposition of iron hydroxides on the electrode surface or in the electrolyte.

High concentrations of electrolytes are favourable so that high volumetric capacity in terms of Wh/L electrolyte can be achieved.

Only a restricted number of electrolytes for flow cells are available in the literature, e.g. vanadium based electrolytes, the triethanolamine-iron complexes in alkaline solution, etc. A significant problem of these substances arises from the toxicity and environmental risks of the electrolytes used, which becomes critical in case of leakages.

US 2014/0028260 describes the use of mixed coordination compounds with metal ions, including iron salicylate for use in redox flow cells.

Arroyo-Curras, Netzahualcoyotl; Hall, Justin W.; Dick, Jeffrey E.; Jones, Richard A.; Bard, Allen J. Journal of the Electrochemical Society (2015), 162(3), A378-A383 describe alkaline iron complexes with triethanolamine as negative electrolyte in combination with cobalt complexes as positive electrolyte in flow cells.

An approach using aminoalcohols as ligands for iron and cobalt complexes has been described for highly alkaline solutions in WO 2015/054260 A2. The complexes mentioned in WO 2015/054260 formed e.g. between iron(III) and triethanolamine are only stable at highly alkaline conditions, thus addition of 3-5 mole/l alkali such as NaOH or KOH are required in the electrolyte. In highly alkaline solution the complexes between iron and cobalt are formed by use of aminoalcohols as ligands.

Summarising the state of the art of iron complexes containing flow cells a substantial amount of complexes for the positive side (positive redox potential) has been described in the literature e.g. hexacyanoferrate, pyridinium containing complexes and aquo-complexes, however there is still demand on suitable iron based complexes which establish a comparable low redox potential e.g. −800 mV in aqueous solution in the pH range between 5 and 10.

Highly negative redox potentials of iron(II/III) redox couples usually are observed in highly alkaline solution e.g. using ligands like triethanolamine and related derivatives (N,N-bis(2-hydroxyethyl)-3-amino-2-hydroxy-propane sulphonic acid or 2,2-bis(hydroxyethyl)-(iminotris)-hydroxymethyl)-methane). The complexes with these ligands are not stable at lower pH e.g. pH 11-12, thus precipitation of iron hydroxides begins and the applicability of the redox couple for purposes of energy storage with use of a neutral electrolyte fails.

BRIEF DESCRIPTION OF THE INVENTION

It is thus an object of the present invention to provide a redox flow battery, which is able to operate in the pH region of pH 5-10 permitting a large potential difference.

This object is solved by a redox flow battery, comprising
a first electrolyte storage,
a second electrolyte storage
an electrochemical cell connected to said first and second electrolyte storages, wherein said electrochemical cell comprises a first half-cell and a second half-cell,
wherein said first half-cell comprises a cathode,
wherein said second half-cell comprises an anode,
wherein said first and second half-cells are separated from each other by an ion exchange membrane, characterized in that
said first electrolyte storage comprises an aqueous solution comprising an iron complex of compound of formula I:

wherein
$R^1$ is selected from the group consisting of H, $CH_2COOH$
$R^2$ is selected from the group consisting of H, COOH and
each of $R^3$, $R^4$, $R^5$, $R^6$ is independently selected from the group consisting of H, $CH_3$, COOH, $SO_3H$,
and stereoisomers of compound of formula I.

The second electrolyte storage may comprise any suitable electrolyte solution. In one embodiment the second electrolyte storage comprises an aqueous solution comprising ferro/ferricyanide. In another embodiment the second electrolyte storage comprises an aqueous solution comprising $O_2/OH^-$.

The first half-cell comprises a first high surface area electrode functioning as a cathode. The second half-cell comprises a second high surface area electrode functioning as an anode. First and second half-cells are separated from each other by a membrane, typically an ion exchange membrane.

Preferably there is a first and a second pump for circulating said electrolytes in said first and second electrolyte storages, respectively, in said anode and said cathode, respectively.

Surprisingly using ethylenediamine based ligands which follow the general formula I lead to complexes which are stable at (close to) neutral pH with both iron(II) and iron(III) as center ions and which exhibit a highly negative redox potential.

The iron complex is an $Fe^{2+}$ or $Fe^{3+}$ complex. It is to be understood that an iron complex of compound of formula I is formed when dissolving the compound of formula I or a salt thereof and mixing it with $Fe^{2+}$ or $Fe^{3+}$. Preferably, the molar ratio of Fe ions and compound of formula I is 1 or close to 1 such as 1.1:1 to 1:1.1.

In one embodiment the first electrode compartment comprises an electrochemically, thermally or chemically activated carbon fibre roving and an 1:1 complex of iron and a phenolic aminocarboxylate ligand according to formula I. The complex is dissolved in an aqueous supporting electrolyte (e.g. $Na_2SO_4$ 0.5 M) and can contain a buffer substance (e.g. boric acid). A second electrode compartment separated with membrane comprises an activated carbon roving and an electrolyte containing a ferro/ferricyanide accompanied by a supporting electrolyte for example. Another electrode for the positive electrode could be redox couple $O_2/OH^-$.

In one embodiment the first half-cell comprises an electrochemically, thermally or chemically activated carbon fibre roving. The activation can be thermal, chemical or electrochemical treatment, usually in oxidizing conditions. In this treatment the non conductive sizing (PU or epoxy resin) is removed, oxygen containing groups and/or surface defects are introduced to the carbon surface. Electrochemical activation can be achieved by anodic treatment in aqueous electrolytes, thermal activation can be achieved by heating above a temperature of 400 ° C. in air athmosphere and chemical activation can be achieved in oxidising agents e.g. chromium-sulfuric acid.

In one embodiment the second half-cell comprises an electrochemically, thermally or chemically activated carbon roving.

In one preferred embodiment one of $R^3$, $R^4$, $R^5$, $R^6$=H, $CH_3$, COOH, or $SO_3H$, with the provision that at least 3 of $R^3$, $R^4$, $R^5$, $R^6$=H.

In one further preferred embodiment $R^4$=H, COOH, or $SO_3H$, and each of $R^3$, $R^5$, $R^6$=H.

In one embodiment the compound of formula I is EDDHA, EDDSA, EDDCA, or HBED.

In a further embodiment the pH of the aqueous solution of the first electrolyte storage is 5 to 10.

DETAILED DESCRIPTION OF THE INVENTION

This section discloses preferred embodiments and examples of the invention.

A compound of formula I such as N,N'-ethylene-bis-(o-hydroxyphenylglycine) (EDDHA) forms stable complexes with iron(II) and iron(III) in the pH range 4-12. Such complexes are present in two diastereomeric forms, the racemic (R,R-S,S) and the meso (R,S-S,R) form.

The technically synthesised product Fe-EDDHA system is non-toxic and is known in use as fertiliser to compensate for iron deficiency. Commercial fertilizers are usually crude mixtures of Fe-EDDHA related compounds and by-products. Chromatographic separation was necessary to examine electrochemical characteristics meso and rac Fe-o,o-EDDHA in detail.

After separation of the two diastereomeric forms, surprisingly cyclic voltammetry of the individual stereoisomers indicated a highly negative redox potential in the pH range 4-12.

Thus such complexes could serve as redox system to operate an electrolyte for the negative side of a redox flow cell at neutral pH.

Thus the system is a first representative for a more general group of complexes which can be used as negative electrolyte e.g. in all-iron flow cells.

Besides the low toxicity also the high negative redox potential at pH 7 is of significant value as such an electrolyte potentially also could be used in an iron/EDDHA—air cell, which would reduce the size of a redox flow battery to half. Such a concept is not possible with alkaline electrolyte as constant adsorption of $CO_2$ in the alkaline negative electrolyte would destroy the cell through continuous neutralisation of the electrolyte and destruction of the coordination compound.

Fe-EDDHA was proposed as MRT contrast agent but is mainly used as fertilizer. Due to its extreme stability constant $Fe^{3+}$ is prevented from precipitation and therefore used as fertilizer.

Because of the relatively high acidity of the phenolic group and the favourable preorganization of the ligand, the complexes are also stable at neutral or acidic pH.

As related compounds only EDTA and DTPA have been proposed for RFC applications but only for the positive electrolyte. EDDHA is a representative for a Compounds of formula I as a new group of ligands which are suitable for use in flow cells, which exhibit by the following structural characteristics:

Linear chain of 8 atoms, with at least 2 N atoms in the chain.

The first and last atoms of the chain are carbon atoms, which also are part of an aromatic ring system.

The two aromatic ring systems forming the end of the linear 2 nitrogen containing chain bear a hydroxyl group in ortho position to the 8 membered chain.

The overall charge of the Fe(II) and Fe(III) form of the complex is negative and thus repulsion anion exchange membrane is achieved and transfer through the membrane is slow due to the size of the ligand molecule.

Figure 1A:
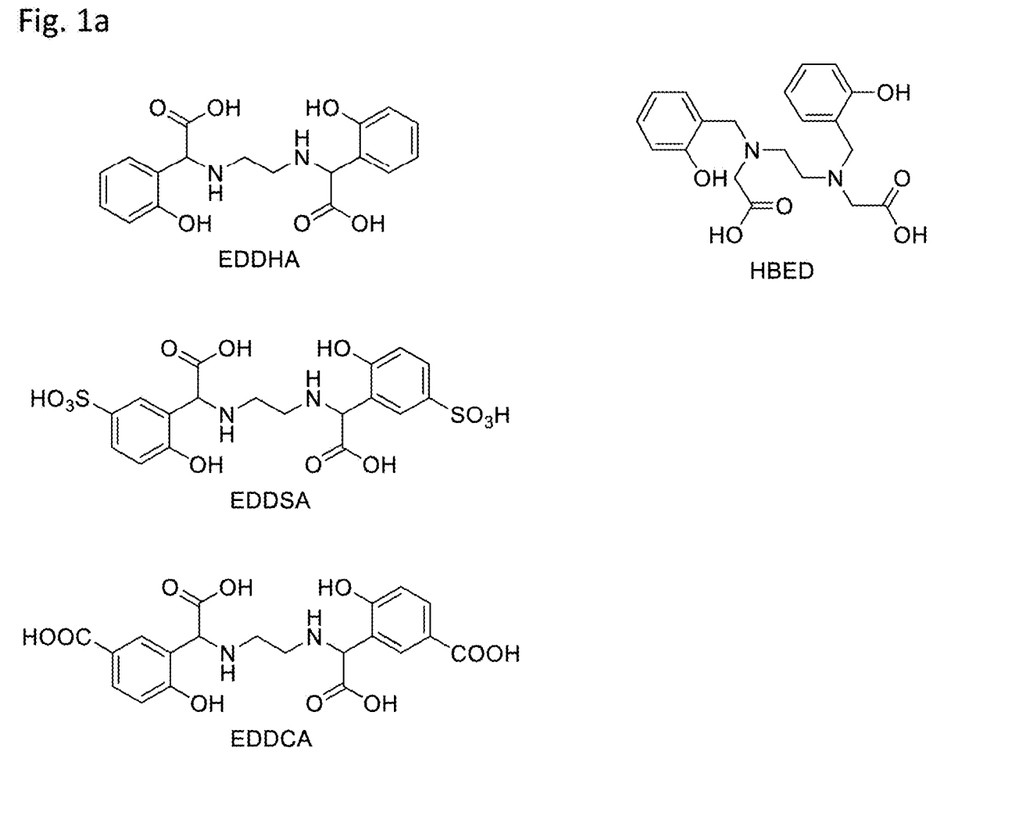
FIG. 1a: Representative examples for ligands to be used as negative electrolyte including EDDHA, EDDSA, EDDCA, and HBED.
Figure 1B:
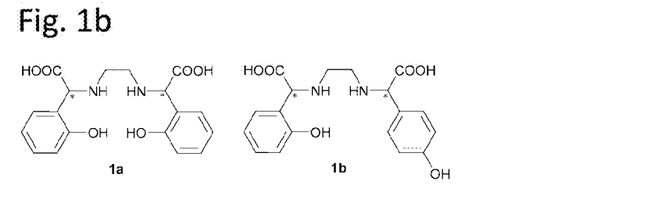
FIG. 1b: Structures of o,o-EDDHA (1a) and o,p-EDDHA (1b).
Figure 1C:
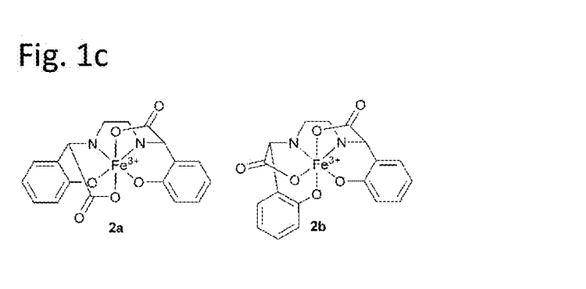
FIG. 1c: Structures of $Fe^{III}$-racEDDHA (2a) and $Fe^{III}$-mesoEDDHA (2b).

Representative examples for structures according to the invention are given in the FIG. 1.

FIG. 1a to 1c shows different structures of compounds of formula I according to the invention. The depicted compounds in FIG. 1a and 1b are shown free of Fe for better representation. However, in the electrolyte Fe(II)/Fe(III) salts thereof are used.

Figure 2:
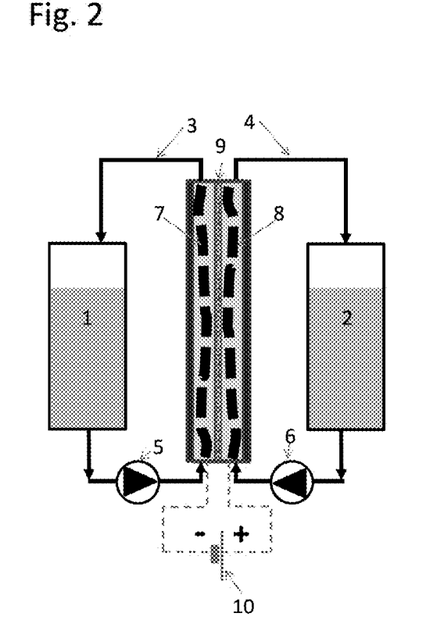
FIG. 2: Schematic representation of a of a redox flow battery according to the invention.

FIG. 2 shows a redox flow battery (RFC), comprising a first electrolyte storage 1, a second electrolyte storage 2 and an electrochemical cell connected to said first 1 and second electrolyte storages 2. The electrochemical cell comprises a first half-cell and a second half-cell, separated by an ion exchange membrane 9. The first half-cell comprises a cathode 7 and 10 the said second half-cell comprises an anode 8.

In the present example the said first electrolyte storage 1 comprises an aqueous solution comprising a compound of formula I in the Fe(II)-state (negative electrolyte reservoir) whereas the second electrolyte storage 2 comprises a compound in the Fe(III)-state (positive electrolyte reservoir). Furthermore, there is a circulation tube 3, a circulation pump 5 for the negative electrolyte and circulation tube 4, a circulation pump 6 for the positive electrolyte.

The cathode 7 may preferably comprise a carbon roving electrode 7 for negative electrolyte and the anode 8 may preferably comprise a carbon roving electrode 8 for positive electrolyte.

For charging there is also a power supply 10.

As representative values for the redox potential the complexes of the diastereoisomers of EDDHA exhibit a negative potential of −600 mV to −650 mV (vs Ag/AgCl, 1 M NaCl) in the pH range of 7-8.

Solubility in an aqueous electrolyte is achieved by complex formation with iron, as well as through introduction of solubilising groups into the ligand structure. The solubilising groups permit use of water as electrolyte.

Solubility increasing groups can be carboxylate groups, sulphonate groups and other substituents which bear a positive or negative charge.

The overall charge of the complex is the sum of the charge of the centre ion (Fe(II/III)) and the charge of the ligands. In case positive counter ions are required for charge neutrality such ions can be from the group of alkali (e.g. $Na^+$, $K^+$) and earth alkali ions (e.g. $Mg^{2+}$).

The maximum concentration of a complex in the ligand depends on the solubility of the complex both in oxidised (Fe(III)) and reduced (Fe(II)) state.

The solubility also is dependent on temperature of application, ground electrolyte, presence of charged groups which increase solubility, and the respective counter ions.

Temperature of operation of the redox system is between 10° C. and 80° C., preferably between 20° C. and 60° C. most preferably between 25° and 35° C.

pH of operation of the redox couple is between pH 4 and pH 12, preferable between pH 5 and pH 10, most preferable between pH 6 and pH 8.

For metal coordination compounds larger sized ligands and ligands exhibiting the same charge as the ion-exchange membrane are preferable.

A flow cell equipped with inert electrodes is suitable to build up an all-iron flow cell. In this case the negative and the positive electrolytes are separated by an ion-selective membrane, which in a preferable embodiment is a cation exchange membrane.

Any electrode material which exhibits sufficient overvoltage against oxygen liberation at the positive side and hydrogen formation at the negative side and which is not sensitive to corrosion will be suited for such flow cell. In a preferred embodiment the electrodes are prepared from carbon or carbon fibres, in a most preferable embodiment the electrodes have been prepared from activated carbon fibres.

For the positive side of the all-iron redox flow cell redox couples which exhibit a highly positive redox potential and which are stable under the conditions of a neutral aqueous solution are preferred. For a non-toxic electrolyte which is applicable in such a redox flow cell the iron-hexacyanoferrate system can be named as an example. However also other systems e.g. phenanthroline complexes, bipyridyl complexes could be used for the positive side.

In a particular embodiment the positive side is formed by an oxygen reducing system, which permits use of minimal volumina and thus reduces costs and weight of an installation substantially. In such a cell the pH of the negative electrolyte is adjusted below pH 7 to avoid continuous uptake of $CO_2$ into the negative electrolyte. In case the negative electrolyte would be a highly alkaline triethanolamine based system the alkalinity would be reduced constantly by uptake of $CO_2$ with the result of constant loss in performance failure of the installation, due to instability of the triethanolamine complex.

The electrode material can be formed as plates, metal films or used in form of wires and conductive fibres.

In a preferred embodiment the fibres forming the electrode material have been arranged in form of a fabric or non-woven structure (web). In a most preferred embodiment the fibres are carbon fibres which have been positioned and arranged to a conductive electrode layer by technical embroidery and activated by chemical pretreatment.

The principle of the invention is demonstrated in the following examples:

A new flow cell with embroidered electrodes e.g. chemically activated carbon fibre rovings was used in successful batch electrolysis experiments. Positive results were obtained in batch electrolysis experiments using EDDHA complexes as negative electrolyte and hexacyanoferrate as positive electrolyte.

A redox flow battery equipped with new carbon-based electrodes as inert electrode material was used. The electrodes were produced with technical embroidery.

Investigation of the electrochemical properties were performed in aqueous solution in the pH range between 4 and 11.5. Both complex isomers exhibit an unexpectedly highly negative redox potential at pH 9 of −642 mV (racemic form) and −615 mV (meso form) vs Ag/AgCl 1 M NaCl reference electrode. The complexes exhibited reversible behaviour at mercury and glassy carbon electrodes, while quasi reversible characteristics were observed at a copper electrode. Without buffer the complex of the meso form hydrolyses above pH 9, while the complex of the racemic isomer shows pH independent redox properties over the full range of pH studied. Also borate buffered solutions were studied. In these solutions below pH 9, E½ shifts positive probably due to ligand competition with borate. Diffusion coefficients of the EDDHA complexes were similar to the Do of the ferric aquo complex. The stability of both Fe(II)form and Fe(III) form of the complexes were sufficient to permit bulk electrolysis experiment without decomposition.

Example 1: Purification of the Complexes by Chromatography, Demetalation and Recomplexation The two stereoisomers of N,N'-ethylene-bis-(o-hydroxyphenylglycine) (EDDHA), racemic (R,R-S,S) and meso (R,S-S,R) were isolated from commercial Fe-EDDHA fertilizer (Folicin-DD, Jost group, 6 wt. % $Fe^{III}$-EDDHA) and separated by chromatography.

The crude powdered fertilizer was extracted with hot absolute ethanol to remove inorganic salts and the isomer $Fe^{III}$-o,p-EDDHA. The liquid phase was separated by centrifugation and the solvent was removed by evaporation. The crude complex was dissolved in 60% ethanol and purified by chromatography on 300 g of basic aluminium oxide (60 mesh, Fluka, glass glass column, 6 cm in diameter and 10 cm height). About 50 ml of the complex saturated eluent were separated in one run, the red band of $Fe^{III}$-racEDDHA was collected first ($R_f$=0.9) followed by the purple $Fe^{III}$-mesoEDDHA ($R_f$=0.6). After removal of ethanol by evaporation, the crude complexes were demetalated by addition 3 M NaOH to precipitate FeOOH. The resulting suspension was centrifuged. After filtration through acid washed Celite (Fluka) the solution was acidified to pH 4.2 with nitric acid and the precipitated ligand was collected by vacuum filtration. After thorough rinsing with acidified water (pH 4.2), the ligand was dried in vacuum.

The purity of the isolated ligands was determined using $^1$H NMR spectroscopy (shift of the α-H-atoms racemic: 4.19(s) ppm meso, 4.25(s) ppm). Both isomers were free of the respective other isomer. The other signals of the H-NMR could be assigned accordingly and integrals matched the molecular composition.

The pure ligand was dissolved in water under addition of a four-times molar excess of NaOH, then a 1.2 molar excess of $FeCl_3$ was added. The pH was adjusted to pH 6-7 with NaOH or $H_2SO_4$ and the solution was allowed to stand overnight. Precipitated $Fe(OH)_3$ centrifuged off and the solvent was removed by evaporation yielding the pure solid complex.

The molar absorptivity was determined in borate buffer solutions at pH 9 (five repetitions). To define the the exact complex concentration an understoichiometric amount of ferric iron was used and the excess of free ligand was tolerated, as the ligand is not electroactive. The molar absorptivity for both isomers is summarized in Table 1 and is in agreement with literature data, which demonstrates the purity of the isolated ligands.

TABLE 1

| Molar absorptivity ($\varepsilon_{480\,nm}$) of $Fe^{III}$-racEDDHA and $Fe^{III}$-mesoEDDHA | | |
|---|---|---|
| Fe-complex | this work | lit. [*] |
| rac | 5026 ± 142 | 4955 ± 37 |
| meso | 4546 ± 120 | 4574 ± 53 |

[*]: F. Yunta, S. García-Marco, J. J. Lucena, M. Gómez-Gallego, R. Alcázar, M. A. Sierra, Inorganic Chemistry 2003, 42, 5412-5421.

Example 2: Cyclic Voltammetry of EDDHA Complexes in Unbuffered Solution

In order to evaluate if Fe-EDDHA isomers meet the requirements of a negative electrolyte for the use in redox flow batteries voltammetric studies were performed. These properties comprise a negative redox potential, facile and reversible electrode kinetics and soluble complexes in reduced and oxidized state.

The coordinating groups of EDDHA bear six protons with different acidity. In order to minimize undesired ligand exchange reactions and solely observe the effect of pH on the redox properties, 0.1 M $NaClO_4$ was chosen as electrolyte for the first set of experiments.

Cyclic voltammetry was performed at a HMDE electrode (Metrohm VA663 electrode stand connected to an Autolab IME663 interface and an Autolab PGSTAT302 potentiostat, controlled by Autolab Nova 1.11), inert atmosphere was maintained with Argon 5.0. A Pt rod served as counter electrode, potentials refer to a (Ag/AgCl, 1 M NaCl) reference electrode. For each CV experiment at the mercury electrode, nine single measurements were recorded and averaged in order to minimize errors originating from drop size fluctuations. Copper electrodes were precleaned with 6 M HNO3 before use and equilibrated in electrolyte solution by running repetitive cycles. The planar glassy carbon electrode (Metrohm, 5 mm diameter) was polished on a polishing micro cloth (Buehler) with 0.05 µM alumina (Buehler) to a mirror like finish between the measurement series.

Figure 3:
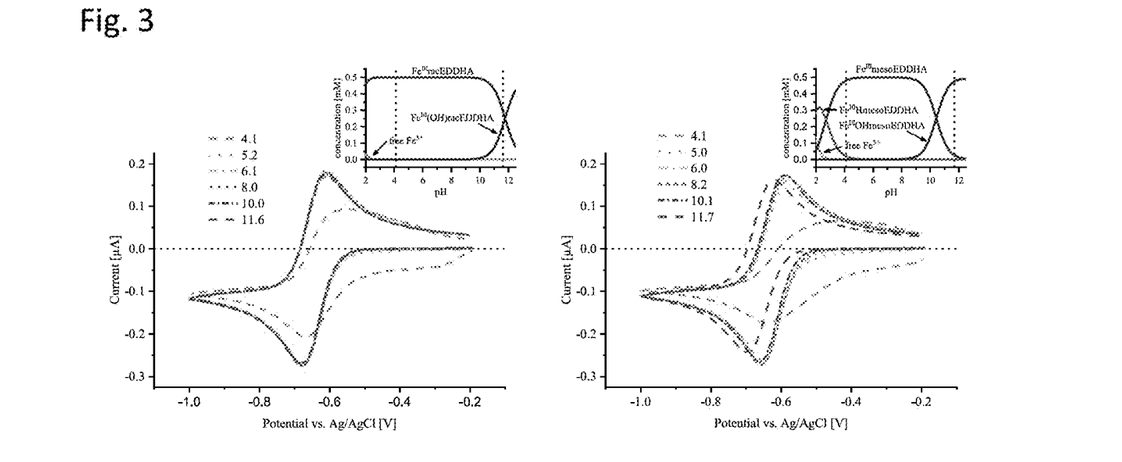
FIG. 3: CV at Hg, pH sweep in unbuffered solution 0.1 M $NaClO_4$, left: 0.5 mM $Fe^{III}$-racEDDHA, right: 0.5 mM $Fe^{III}$-mesoEDDHA, insets: species distribution simulation based on stability constants of $Fe^{III}$-EDDHA species.
Figure 4:
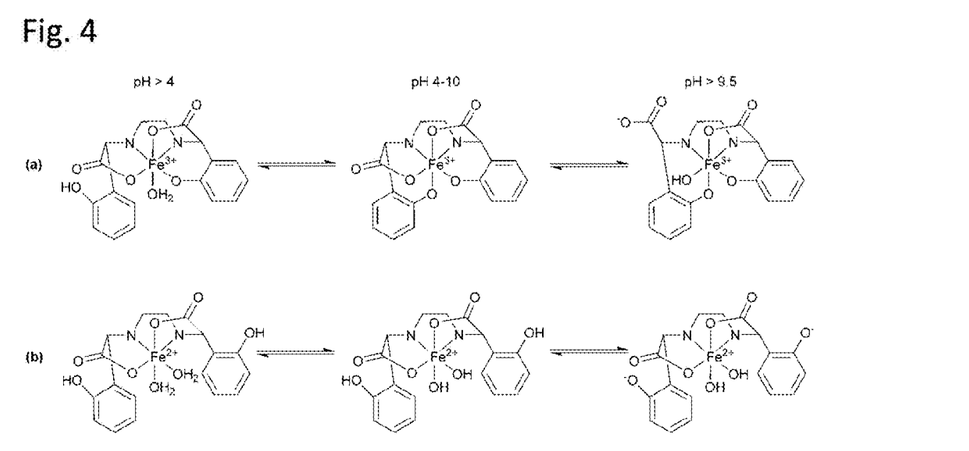
FIG. 4: Different protonation states of (a) $Fe^{III}$-mesoEDDHA complexes (derived from the simulation of the species distribution) and proposed structures of (b) $Fe^{II}$-mesoEDDHA complexes.

FIG. 3 shows the voltammograms of both isomers in the pH range from 4.1 to 11.6. The simulated species distribution of the different complexes present also is given. The tentatively proposed structures of the involved species are depicted in FIG. 4.

In the range of pH 5-11.6 for racemic and in the pH range of 6-9 for the meso species the voltammograms were independent on pH. At higher pH values $E_{1/2}$ of the meso complex change to more negative values and $i_{pc}$ becomes smaller, which indicates beginning complex hydrolysis and precipitation of FeOOH. Below pH 5 the redox potential is shifted to more positive values and the system becomes quasi reversible. Lower pH values lead to a decreasing stability of the complex which becomes obvious in a decrease in peak height and a shift to a more positive redox potential. Examples of possible structures of differently protonated ferrous complexes are shown in FIG. 4.

For detailed electrochemical studies pH 9 was chosen. Table 2 shows voltammetric data for rac and meso complexes at pH 9 in unbuffered solution. Both isomers exhibit a maximum peak current at pH 9 which can be explained by high their diffusion coefficients and a presence of a single species. The peak potential separation ΔEp is close to 60 mV and the ratio $i_{pa}/i_{pc}$ is close to 1 which is characteristic for a reversible redox system.

TABLE 2

Electrochemical data of 0.5 mM Fe-EDDHA in unbuffered solution, 0.1M NaClO4

|  | $E_{pc}$ mV | $E_{pa}$ mV | $E_{1/2}$ mV | $\Delta E_P$ mV | $i_{pc}$ nA | $i_{pa}$ nA | $i_{pa}/i_{pc}$ |
|---|---|---|---|---|---|---|---|
| rac | −678 | −613 | −645 | 65 | −276 | 267 | 0.97 |
| meso | −657 | −585 | −621 | 72 | −275 | 255 | 0.93 |

Example 3: Voltammetric Response in Borate Buffer

To avoid disturbing influences of local changes in pH within the diffusion layer of the electrodes, cyclic voltammetry with use of buffered solutions was performed.

Ideally the buffer substance chosen should exhibit no or at maximum only weak coordination tendencies towards both ferric and ferrous iron to avoid ligand competition with the relatively weak $Fe^{II}$-EDDHA complexes. This could lead to disturbing interferences with the redox potential of the EDDHA complexes. Borate buffers were chosen due to the high buffer capacity around pH 9 (pKa=8.97), the non-toxic and redox inactive properties.

A 100 mM NaClO4 background supporting electrolyte was used to maintain diffusion limited conditions and high solution conductivity. 50 mM boric acid was added to the NaClO4 supporting electrolyte and adjusted with NaOH to the desired pH value.

Figure 5:
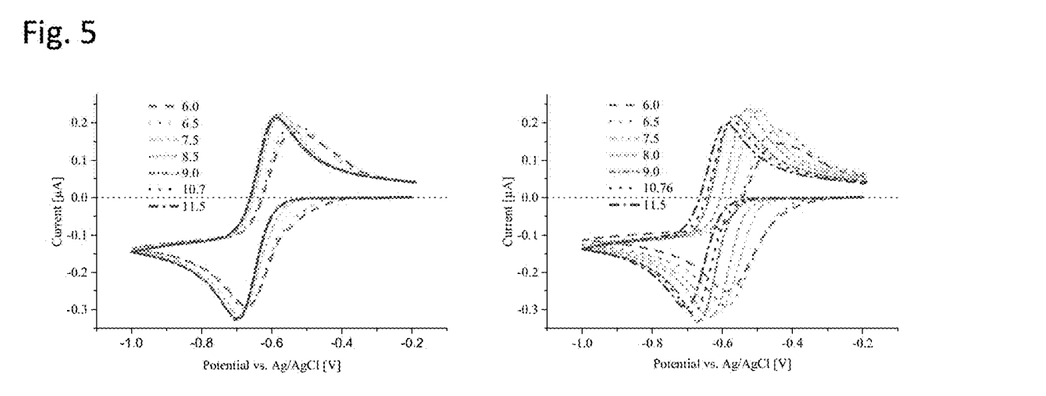
FIG. 5: CV at Hg, pH sweep in buffered solution; 50 mM borate, 100 mM $NaClO_4$, left: 0.5 mM $Fe^{III}$-racEDDHA right: 0.5 mM $Fe^{III}$-mesoEDDHA.
Figure 6:
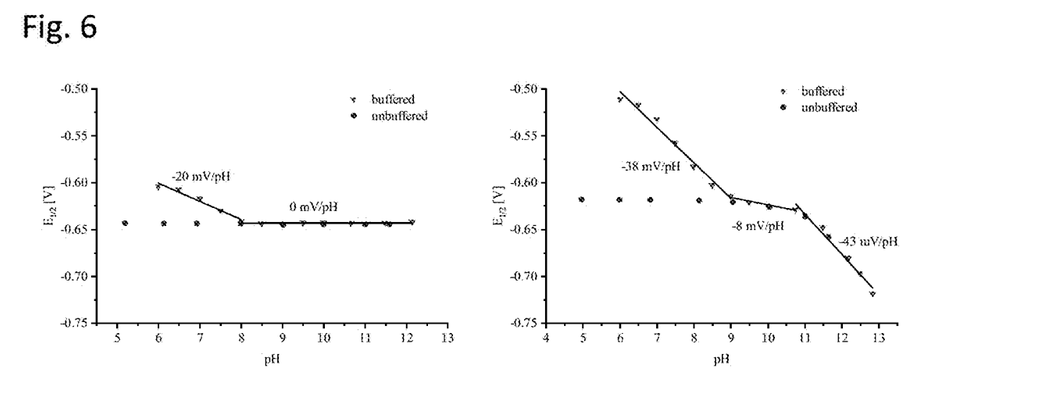
FIG. 6: $E_{1/2}$ vs pH, comparison of unbuffered vs buffered system; left: $Fe^{III}$-racEDDHA, right: $Fe^{III}$-mesoEDDHA.

FIG. 5 shows the cyclovoltammograms of solutions in the pH range between 6 and 11.5. Above pH 8 (racemic) and above pH 9 (meso) $E_{1/2}$ both develop almost equally in buffered and unbuffered solution. Below these pH values $E_{1/2}$ of the racemic isomer shifts to more positive values with reducing pH (slope of −20 mV/pH). $E_{1/2}$ of the meso species reduces with a slope of −38 mV/pH (FIG. 6).

For both iron complexes a maximum $i_{pc}$ is observed around pH 9. Adsorption effects lead to $i_{pc}/i_{pa}$ larger than 1 at pH values lower 8 but vanish at higher pH values. $\Delta E_p$ decreases with decreasing pH value which indicates slower kinetics or superposition of the signals of multiple electroactive complex species.

Comparison of the values for $E_{1/2}$ values for both isomers in unbuffered solution and in borate buffer at pH 9 demonstrated that borate buffer pH 9 is an ideal electrolyte for both isomers in further experiments. The experiments also permit calculation of the diffusion coefficients (five solutions in the concentration range between 0.3 and 0.8 mM) (Table 3). Literature values for the $Fe^{3+}$ diffusion coefficient range from 3.3-6.5×10$^{-6}$ cm$^2$/s in acidic media to 8.6×10$^{-6}$ cm$^2$/s complexed as $K_3Fe(CN)_6$ in strongly basic media. Despite the relatively large molecule size of the ligand in the Fe-EDDHA complex the diffusion coefficients are comparable to $Fe^{3+}$ or the smaller complex $[Fe(CN)_6]^{3-}$. The Fe-TEOA complex which was proposed as RFB catholyte at pH 14 shows a diffusion coefficient about one magnitude smaller than Fe-EDDHA.

TABLE 3

Diffusion coefficients of ferric complexes

| species | $D_o \cdot 10^{-6}$ cm$^2$/s | pH | source |
|---|---|---|---|
| Fe-racEDDHA | 5.39 | 9 | this work |
| Fe-mesoEDDHA | 5.78 | 9 | this work |
| $Fe^{3+}$ | 3.3-6.5 | 0-1 | a |
| $[Fe(CN)_6]^{3-}$ | 7.62 | 7 | b |
| Fe(TEOA) | 0.71 | 14 | b | a: A. F. Gil, L. Galicia, I. González, *Journal of Electroanalytical Chemistry* 1996, 417, 129-134 b: K. Gong, F. Xu, J. B. Grunewald, X. Ma, Y. Zhao, S. Gu, Y. Yan, *ACS Energy Letters* 2016, 1, 89-93

Figure 7:
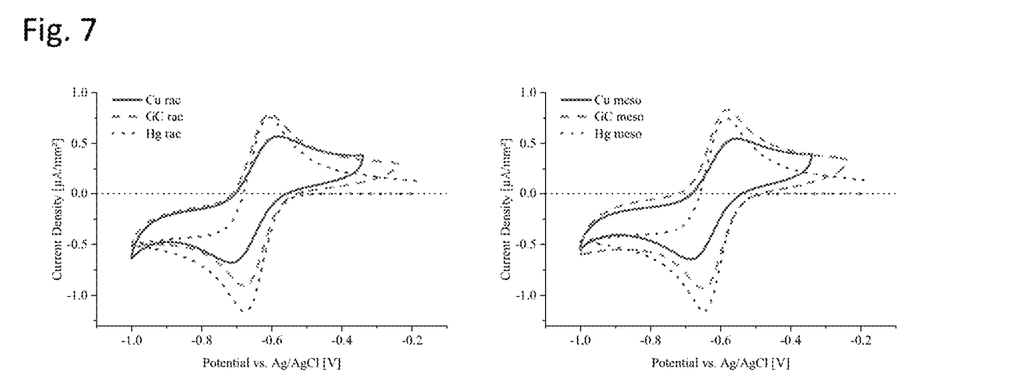
FIG. 7: CV at Hg/GC/Cu; 50 mM borate buffer pH 9, 100 mM $NaClO_4$; left: 0.5 mM $Fe^{III}$-racEDDHA, right: 0.5 mM $Fe^{III}$-mesoEDDHA.

For technical application other electrode materials than mercury are preferable, thus the voltammetric response of $Fe^{III}$-racEDDHA and $Fe^{III}$-mesoEDDHA was studied with copper and glassy carbon electrodes (FIG. 7).

$E_{1/2}$ for $Fe^{III}$-mesoEDDHA and $Fe^{III}$-racEDDHA remains almost independent of the three electrode materials studied (Table 4). At mercury and glassy carbon electrodes the peak separation was determined close to 60 mV, which is typical for an ideally reversible one electron transfer. Also the ratio of $i_{pa}/i_{pc}$ is close to the ideal value of 1. At the copper electrode a larger peak separation of 134 mV and 132 mV indicates a quasi-reversible electron transfer. Also product adsorption was indicated by an $i_{pa}/i_{pc}$ ratio larger than 1.

TABLE 4

Voltammetric response of 0.5 mM $Fe^{III}$-EDDHA at Hg/Cu/GC, 50 mM borate buffer pH 9, 0.1M $NaClO_4$

| electrode | isomer | $E_{1/2}$ mV | $\Delta E_p$ mV | $i_{pa}/i_{pc}$ 1 | $j_{pc}$ nA/mm$^2$ |
|---|---|---|---|---|---|
| Hg | rac | −642 | 67 | 0.97 | 1159 |
| Hg | meso | −615 | 64 | 0.93 | 1167 |
| Cu | rac | −649 | 134 | 1.07 | 562 |
| Cu | meso | −619 | 132 | 1.06 | 520 |
| GC | rac | −641 | 73 | 0.97 | 816 |
| GC | meso | −616 | 67 | 0.94 | 817 |

Mercury and GC showed high peak current density, $j_{pc}$, while the slower kinetics at copper electrodes lead to lower peak current density.

Figure 8:
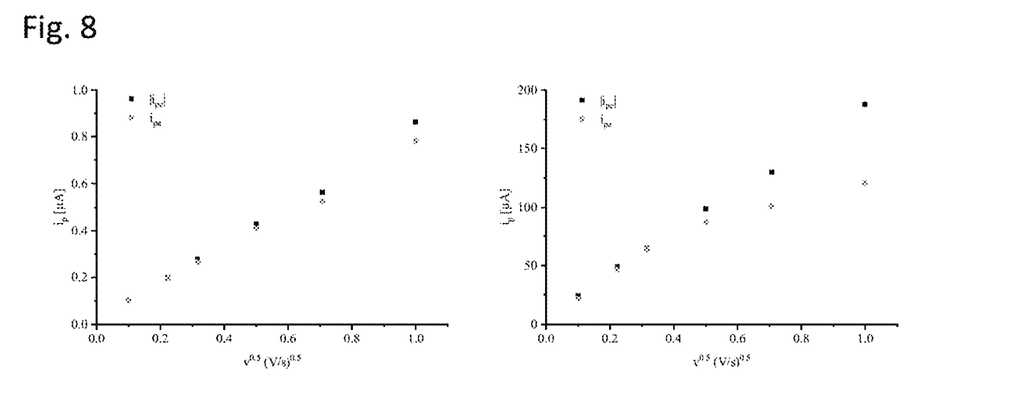
FIG. 8: $i_p$ vs (scan rate)$^{0.5}$, left: mercury electrode, right: copper electrode, 0.5 mM $Fe^{III}$-racEDDHA, 50 mM borate buffer pH 9, 100 mM $NaClO_4$.

Experiments with different scan rates were carried out to study electrode kinetics. In the plot of the absolute current value vs (scan rate)$^{0.5}$ linear relationship was observed up to 1 V/s. Anodic currents also showed good linearity at Hg and GC electrodes but deviated at scan rates higher than 0.25 V/s for the copper electrode (FIG. 8), which is due to limited electron transfer rate at a copper interface and adsorption effects. No significant differences between meso and rac complexes could be observed in this set of experiments.

Example 4: Bulk electrolysis of Fe-EDDHA in borate buffer A graphite rod in an external beaker served as anode. Electric connection was established using a salt bridge filled with electrolyte. A $HNO_3$ cleaned copper sheet with approx. 10 cm$^2$ surface acted as the cathode. During electrolysis the solution was continuously stirred and purged with Ar.

Figure 9:
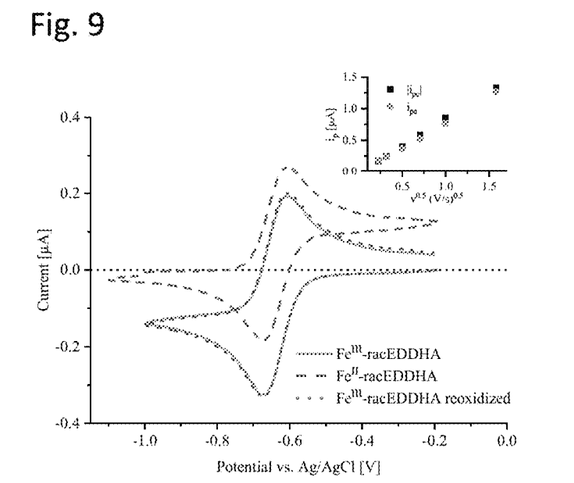
FIG. 9: CV of 0.5 mM $Fe^{III}$-racEDDHA (before bulk electrolysis), $Fe^{II}$-racEDDHA (after bulk electrolysis) and reoxidized $Fe^{III}$-racEDDHA in borate buffer pH 9, 100 mM $NaClO_4$, insert: $i_p$ vs (scan rate)$^{0.5}$ of $Fe^{II}$-racEDDHA.

1 mM solutions (0.1 M $NaClO_4$, 50 mM borate pH 9) of both isomers could be successfully reduced at a copper electrode, yielding a colourless solution at the end of the experiment. In a CV experiment (FIG. 9) performed after the complete reduction of the $Fe^{3+}$-complex only the oxidation of $Fe^{2+}$-complex was observed, thus proving the complete absence of ferric iron. Due to the high stability of the ferrous complex the solution could be stored unchanged as long as access of oxygen was prevented. In presence of environmental oxygen, rapid reoxidation was observed and the characteristic deep red colour of the $Fe^{3+}$ complex reappeared. CV were recorded in the full reduced state and after reoxidation which demonstrated the stability of the complexes (FIG. 9).

Example 5a: Full Charge/Discharge $Fe^{III}$-racEDDHA

Negative side: 100 mL flask, (Ag/AgCl 3 M KCl/Pt, Ag/AgCl 1 M NaCl, Phototrode d=235 μm, λ=480 nm), Ar inlet, Carbon fibre loop forming the electrode with a length of approximately 6 cm (48k filaments, Toho Tenax STS40; activation: chromic acid dipping 60 min), electrolyte: 70 ml 9 mM Fe-racEDDHA, 1 M $Na_2SO_4$, 50 mM Borate pH9, stirring 350 rpm.

Separator (salt bridge): glass U-tube 12 mm i.D., ends sealed with P2 glass frits, filled with 1 M $Na_2SO_4$, 50 mM Borate pH 9

Positive side: 100 ml Flask; electrolyte: 70 mL 1 M $Na_2SO_4$, 1 mM Borate pH 9, Pt mesh electrode approx. 2×4 cm, stirring 350 rpm Electrolysis control: charge: −30 mA galvanostatic until E(WE)=−0.850 V vs Ag/AgCl 1 M NaCl then potentiostatic −0.85 V to full charge (abs=0). Discharge: 30 mA galvanostatic until E(WE)=−0.370 V vs Ag/AgCl 1M NaCl then potentiostatic −m0.370 V to full discharge (abs=1.06).

Current efficiency: Charge=96%, Discharge=99.6%

Example 5b: Full charge/discharge $K_3[Fe(CN)_6]$

Positive side: 100 mL flask, (Ag/AgCl 3 M KCl/Pt, Ag/AgCl 1 M NaCl, Phototrode d=700 μm, λ=420 nm), Ar inlet, Carbon fibre loop forming the electrode with a length of approximately 6 cm (48k filaments, Toho Tenax STS40; activation: chromic acid dipping 60 min), electrolyte: 70 ml 10.3 mM $K_3[Fe(CN)_6]$ 1 M $Na_2SO_4$, 1 mM Borate pH 9, stirring 350 rpm.

Separator (salt bridge): glass U-tube 12 mm i.D., ends sealed with P2 glass frits, filled with 1 M $Na_2SO_4$, 1 mM Borate pH 9

Negative side: 100 ml Flask; electrolyte: 70 mL 1 M $Na_2SO_4$, 1 mM Borate pH 9, Pt mesh electrode approx. 2×4 cm, stirring 350 rpm Electrolysis control: charge: −m30 mA galvanostatic until E(WE)=−m0.07 V vs Ag/AgCl 1M NaCl then potentiostatic −m0.07 to full charge (abs=0). Discharge: 30 mA galvanostatic until E(WE)=0.530 V vs Ag/AgCl 1M NaCl then potentiostatic 0.530 V to full discharge (abs=0.751).

Current efficiency: Charge=100%, Discharge=99.6%

Figure 10:
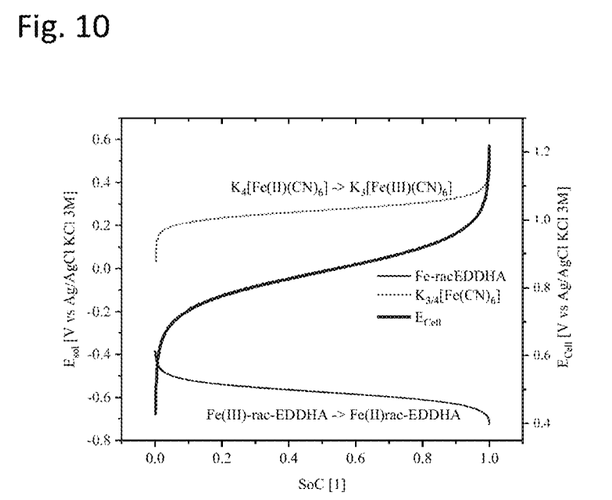
FIG. 10: State of charge curves (SoC) versus potential for the two systems Fe-racEDDHA and $K_3/K_4Fe(CN)_6$ and the resulting theoretical cell voltage of an all-iron RFC.
Figure 11:
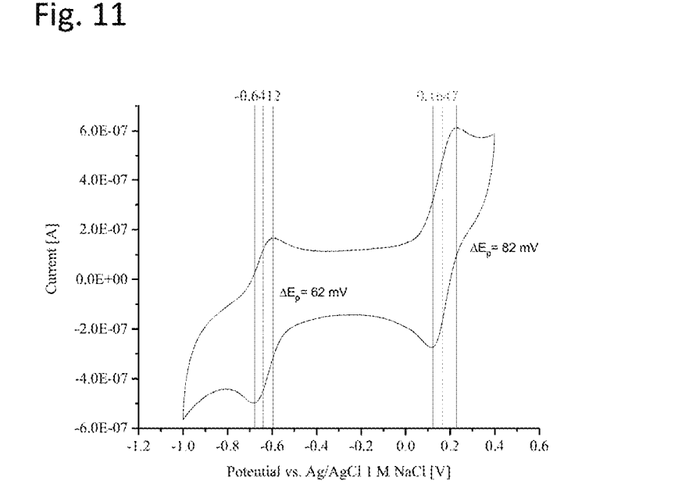
FIG. 11: Cyclovoltammogram of a solution containing the racemic Fe-racEDDHA complex and the hexacyanoferrate complex in 1 mM in 1M $Na_2SO_4$, pH 9, 5 mm glassy carbon electrode.

The half cell setup in example 5a and 5b show a successful charge and discharge cycle for the Fe-racEDDHA and $K_3[Fe(CN)_6m]$ electrolyte. FIG. 10 demonstrates the state of charge vs potential curves of each individual redox couple and the theoretical overall cell voltage of an all-iron battery based on these species. Cyclic voltammograms of the two redox couples at a GC electrode in the same electrolyte are shown in FIG. 11.

The chemical reversibility and stability of the redox couples on both sides of the cell clearly were demonstrated and the electrochemical functionality of the iron-EDDHA system was demonstrated by the experiment.

Example 6: Redox Flow Cell Experiment

Figure 12:
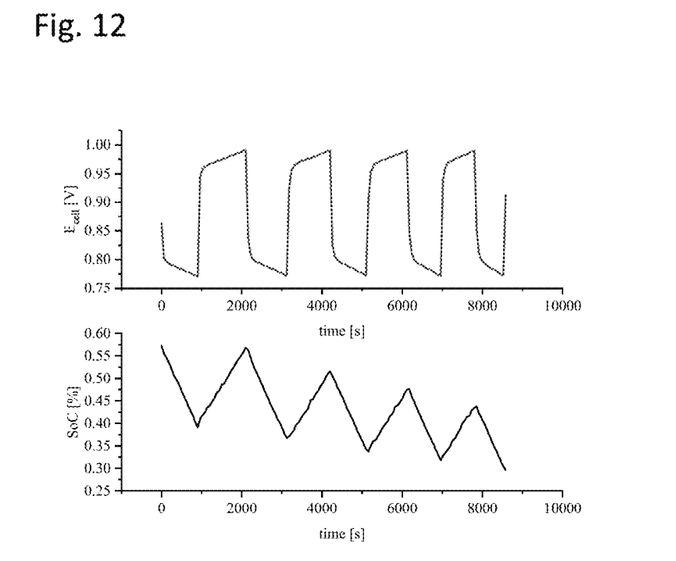
FIG. 12: Charge/discharge cycling of an redox flow cell; top: $E_{cell}$ vs time; bottom: State of charge (Fe-racEDDHA) vs time.

In a redox flow cell assembly an all-iron cell was built based on the redox couples Fe-EDDHA as the negative electrolyte and $K_4[Fe(CN)_6]$ as the positive electrolyte. The relatively large self discharge caused by oxygen diffusion into the cell prototype was compensated by a reduced discharge current. FIG. 12 shows 5 cylces of discharge/ charge in a predefined cell potential window. A continuous flow cell was used through which the electrolyte was pumped by means of a tube pump (6 ml/min) to achieve a continuous circulation. The positive and negative chambers were separated with a cation exchange membrane. Activated carbon rovings were used as anode and cathode.

Negative side: 25 ml of 10.78 mM $Fe^{III}$-racEDDHA in 1 M $Na_2SO_4$, 50 mM borate buffer pH 9 in a 45 ml polypropylene tank equipped with a pH electrode and a Ag/AgCl 3 M KCl/Pt redox probe.

The invention claimed is:
1. A redox flow battery, comprising:
a first electrolyte storage,
a second electrolyte storage, and
an electrochemical cell connected to said first and second electrolyte storages,
wherein said electrochemical cell comprises a first half-cell and a second half-cell,
wherein said first half-cell comprises a cathode,
wherein said second half-cell comprises an anode, wherein said first and second half-cells are separated from each other by an ion exchange membrane, wherein said first electrolyte storage comprises an aqueous solution comprising an iron complex of a compound of formula I:

wherein
- $R^1$ is selected from the group consisting of H, $CH_2COOH$,
- $R^2$ is selected from the group consisting of H, COOH, and
- each of $R^3$, $R^4$, $R^5$, $R^6$ is independently selected from the group consisting of H, $CH_3$, COOH, $SO_3H$, and stereoisomers of compound of formula I,
- one of $R^3$, $R^4$, $R^5$, $R^6$ is H, $CH_3$, COOH, or $SO_3H$, with the provision that at least 3 of $R^3$, $R^4$, $R^5$, $R^6$ is H.

2. A redox flow battery according to claim 1, wherein the second electrolyte storage comprises an aqueous solution comprising ferro/ferricyanide.

3. A redox flow battery according to claim 1, wherein the second electrolyte storage comprises an aqueous solution comprising $O_2/OH^-$.

4. A redox flow battery according to claim 1, wherein the iron complex is an $Fe^{2+}$ or $Fe^{3+}$ salt.

5. A redox flow battery according to claim 1, wherein the pH of the aqueous solution of the first electrolyte storage is in a range of 4 to 12.

6. A redox flow battery according to claim 1, wherein the first half-cell comprises an electrochemically, thermally or chemically activated carbon fibre roving.

7. A redox flow battery according to claim 1, wherein the second half-cell comprises an electrochemically, thermally or chemically activated carbon roving.

8. A redox flow battery according to claim 5, wherein the pH of the aqueous solution of the first electrolyte storage is in a range of 5 to 10.

9. A redox flow battery according to claim 5, wherein the pH of the aqueous solution of the first electrolyte storage is in a range of 6 to 8.

10. A redox flow battery, comprising:
- a first electrolyte storage,
- a second electrolyte storage, and
- an electrochemical cell connected to said first and second electrolyte storages, wherein said electrochemical cell comprises a first half-cell and a second half-cell, wherein said first half-cell comprises a cathode, wherein said second half-cell comprises an anode, wherein said first and second half-cells are separated from each other by an ion exchange membrane, wherein said first electrolyte storage comprises an aqueous solution comprising an iron complex of a compound of formula I:

wherein
- $R^1$ is selected from the group consisting of H, $CH_2COOH$,
- $R^2$ is selected from the group consisting of H, COOH, and
- each of $R^3$, $R^4$, $R^5$, $R^6$ is independently selected from the group consisting of H, $CH_3$, COOH, $SO_3H$, and stereoisomers of compound of formula I, wherein the second electrolyte storage comprises an aqueous solution comprising $O_2/OH^-$.

* * * * *